United States Patent [19]

Gauchet et al.

[11] Patent Number: 4,530,465
[45] Date of Patent: Jul. 23, 1985

[54] METHOD AND DEVICE FOR CALIBRATING A REGULATED FLOW SPRAYING APPARATUS

[75] Inventors: Yves Gauchet, Montereau; André Crinquette, Villeneuve-la-Guyarde; Pascal Martinet, Libercourt; Denis Lestradet, Moret sur Loing, all of France

[73] Assignee: Nodet Gougis, Montereau, France

[21] Appl. No.: 450,660

[22] Filed: Dec. 17, 1982

[30] Foreign Application Priority Data

Dec. 29, 1981 [FR] France ................. 81 24450

[51] Int. Cl.³ .................. G01F 11/10; B05B 1/20
[52] U.S. Cl. ..................... 239/127; 73/223; 239/159
[58] Field of Search ............. 222/30, 55; 73/3, 223, 73/168; 239/127, 159

[56] References Cited

U.S. PATENT DOCUMENTS

| 2,810,606 | 10/1957 | Taylor | 239/127 X |
| 3,271,993 | 9/1966 | Whitson | 73/168 X |
| 4,196,852 | 4/1980 | Thomas | 239/113 |
| 4,301,944 | 11/1981 | Lestradet | 239/156 X |
| 4,331,262 | 5/1982 | Snyder et al. | 73/168 X |

FOREIGN PATENT DOCUMENTS

| 1038314 | 9/1958 | Fed. Rep. of Germany . |
| 2,017,530 | 8/1971 | Fed. Rep. of Germany . |
| 2266450 | 10/1975 | France . |
| 2396353 | 6/1978 | France . |

OTHER PUBLICATIONS

Thornton, M. E. and R. Kibble-White, "Chemicals and Equipment", *PANS*, vol. 20, No. 4, Dec. 1974.

*Primary Examiner*—Andres Kashnikow
*Assistant Examiner*—Kevin P. Weldon
*Attorney, Agent, or Firm*—Frost & Jacobs

[57] ABSTRACT

A method and device are disclosed for calibrating a regulated flow spraying apparatus of the type including a source of spraying fluid under pressure, and spray nozzles, the flow rate of the spray nozzles being regulated by varying the pressure of the liquid delivered thereto, the regulation being controlled as a function of at least one external parameter and a calibration parameter. Fluid from the source is conveyed to a calibration circuit comprising a flow rate sensor and at least one calibration nozzle. The flow rate and the pressure of the fluid are measured in the calibration circuit. The calibration parameter is calculated from the measured values of the flow rate and pressure.

10 Claims, 3 Drawing Figures

METHOD AND DEVICE FOR CALIBRATING A REGULATED FLOW SPRAYING APPARATUS

BACKGROUND OF THE INVENTION

The present invention relates to a method and device for calibrating a regulated flow spraying apparatus and such a spraying apparatus. The invention is particularly useful for spraying fluids, namely in the field of agriculture.

Fluid spraying apparatus are already known comprising one or more sized orifices or nozzles having a flow rate regulated as a function of at least one external parameter, for example, the speed of the vehicle on which the nozzles are mounted. In this way the amount of fluid sprayed per unit surface area may be maintained at a predetermined value.

It is already known to regulate the flow rate of nozzles by adjusting the pressure of the liquid. Indeed, for values of pressures and flow rates used in such applications the flow rate q and the pressure p of the sprayed fluid are related with good accuracy by an equation of the form $q = kp^x$. In this formula the exponent x is generally equal to $\frac{1}{2}$. The coefficient k depends on numerous parameters and in particular on the geometrical characteristics of the spray nozzles and the properties of the sprayed fluid, for example its viscosity.

In known methods for regulating the flow rate of the sprayed substance by adjusting the pressure, the coefficient k called the "calibration parameter" in the rest of the specification is introduced by the user who thus determines the regulating equation.

The introductio or insertion of the calibration parameter by the user may be carried out explicitly. In this case the user takes the value of the calibration parameter from tables or graphs furnished by the manufacturer of the nozzles or determined by trial and error. The introduction or insertion of this parameter may also be determined implicitly when the apparatus comprises a calculator which determined the calibration parameter as a function of the size of the nozzles, the flow rate, the pressure, the viscosity and the density being given.

In all these cases the calibration parameter is determined at given point in time in conditions deemed representative of the operational spraying characteristics. These conditions are obviously not complied with, and sometimes are not even remotely close. Thus, the viscosity and density of the fluid may vary considerably, especially when the temperature varies. Further, the nozzles corrode gradually whereby their actual size varies.

SUMMARY OF THE INVENTION

The invention remedies the foregoing drawbacks and relates to the automatic, periodic determination of the value of the calibration parameter k, either automatically or by the user. The invention therefore relates to the regulation of the flow of sprayed fluid not only as a function of an external factor but also as a function of variations of the characteristics of the nozzles and properties of the sprayed substance.

More precisely, the invention relates to a method for calibrating a regulated flow spraying apparatus of the type including:

a source of spraying fluid under pressure;
spray nozzles;

regulation means for regulating the flow rate of the spray nozzles by varying the pressure of the liquid delivered to the spray nozzles; and control means for controlling the regulation means as a function of at least one external parameter and a calibration parameter.

According to the invention the method comprises:

conveying fluid from the source of fluid to the calibration circuit comprising flow rate sensing means and at least one calibration nozzle mounted in series;

measuring the flow rate and the pressure of the fluid in the calibration circuit;

calculating the calibration parameter from the measured values of the flow rate and the pressure of the fluid, and transmitting the calibration parameter to said control means.

The flow rate is advantageously measured by filling a predetermined volume with fluid and measuring the time for emptying the predetermined volume.

The pressure may be measured by the method used for regulating the spray fluid flow rate, i.e., the pressure of the fluid supplied by the source of fluid.

The calculating of the calibration parameter advantageously comprises determining the ratio of the measured flow rate and the pressure at the predetermined power or exponent, for example, $\frac{1}{2}$.

It is advantageous for the nozzle flow rate to be regulated by adjusting the flow rate of the flow of fluid back to the source.

It is advantageous for the method operations to be automatically repeated with predetermined intervals.

The invention also relates to a calibration device for regulated flow spraying apparatus of the type including:

a source of fluid under pressure:

spray nozzles connected to the source of fluid by a line;

regulation means for regulating the flow rate of the spray nozzles by varying the pressure of the fluid delivered to the nozzles; and control means for controlling the regulation means as a function of an external parameter and a calibration parameter.

According to the invention, the calibration device comprises:

calculating means for calculating the calibration parameter;

flow rate sensing means connected to the source of fluid either directly or by means of the line supplying the spray nozzles, the flow rate sensing means being adapted to deliver a flow rate signal to the calculating means;

a calibration nozzle connected to the flow rate sensing mean for receiving fluid detected by the flow rate sensing means;

a manometric sensor adapted to detect a pressure representative of the fluid pressure in the proximity of the calibration nozzle and transmitting a pressure signal to the calculating means; and a link formed between the calculating means the control means of the spraying apparatus.

It is advantageous for the source of fluid to comprise a tank and a pump, and the regulation means comprises a regulating valve disposed in a branch line between the delivery side of the pump and the storage tank.

In a preferred embodiment the oontrol member, the calculating means and the associated link together comprise a single microprocessor circuit.

The flow rate sensing means is advantageously of the kind which measures the time for emptying a predetermined volume of fluid.

In an embodiment the calibration nozzle comprises at least one of the spray nozzles. In another embodiment in which the source of fluid comprises a storage tank and a pump, the calibration nozzle is separate from the spray nozzles and spray fluid into the storage tank.

It is advantageous for the manometric sensor to be one which measures the pressure of the fluid delivered to the spray nozzles.

The invention also relates to a spraying apparatus of the type including a source of fluid under pressure, spray nozzles connected to the source of fluid through a line, regulation means for regulating the flow rate of spray nozzles by varying the pressure of fluid delivered to the spray nozzles, control means for controlling the regulation means as a function of an external parameter and a calibration parameter and a calibration device as previously described.

According to the improvement a calibration device is provided comprising: calculating means for calculating the calibration parameter; flow rate sensing means connected to the source of fluid and supplying the spray nozzles, the flow rate sensing means being adapted to deliver a flow rate signal to the calculating means; a calibration nozzle connected to the flow rate sensing means for receiving fluid detected thereby; a manometric sensor adapted to detect a pressure representative of the fluid pressure in the proximity of the calibration nozzle and transmit a pressure signal to the calculating means; and a link formed between the calculating means and the control means.

These and other features and advantages of the invention will be better brought out in the description which follows, given with reference to the accompanying drawings.

DESCRIPTION OF THE PREFERRED EMBODIMENTS

Figure 1:
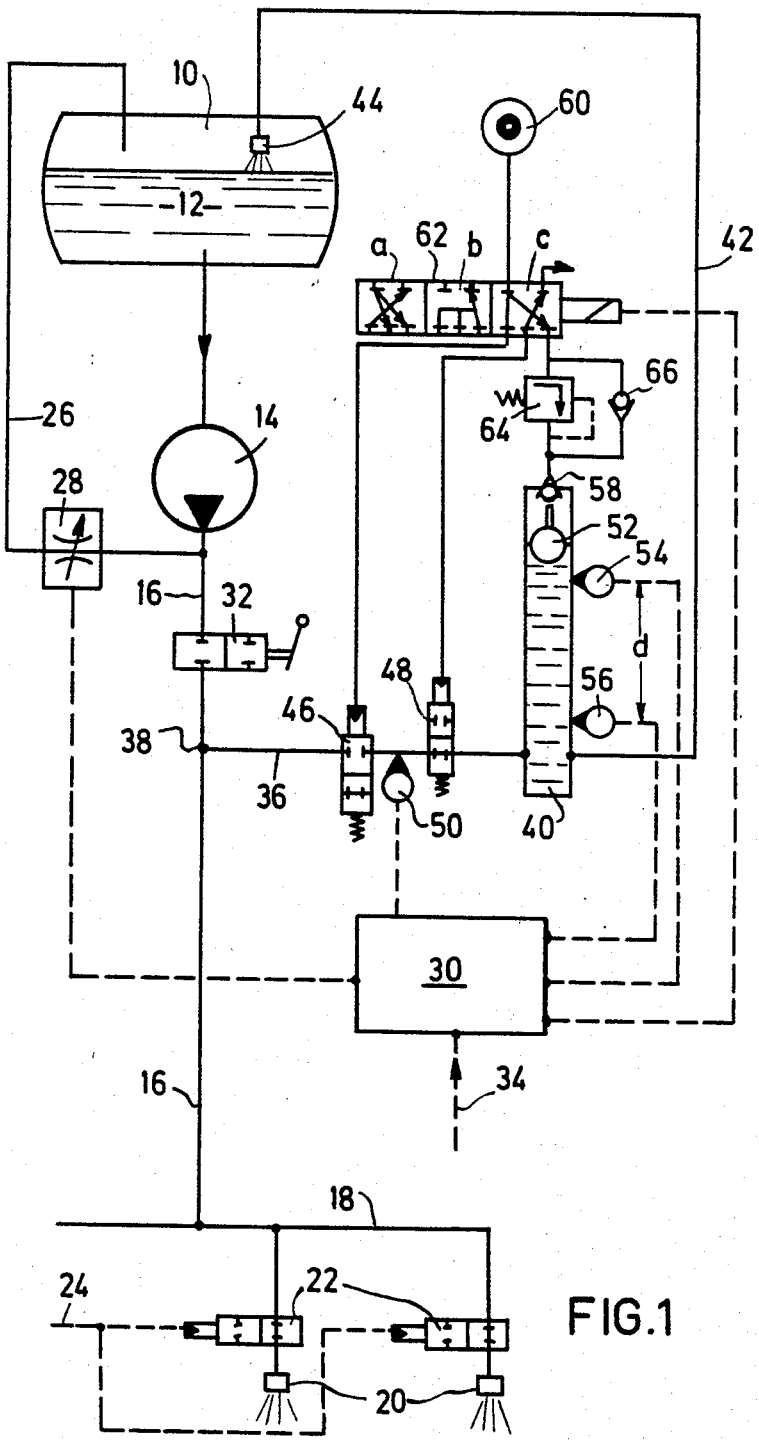
FIG. 1 is a schematic drawing of a first embodiment of the regulated flow spraying apparatus comprising a calibration device according to the invention.

FIG. 1 is a schematic diagram of a first embodiment of the invention. In this figure a regulated flow spraying apparatus comprises a storage tank 10 for a spraying fluid 12, for example a solution for treating plants. A pump 14 pumps the fluid and conveys it under pressure to a line or conduit 16 which supplies a spray boom 18 comprising nozzles 20. Communication of the nozzles 20 with line 16 is through valves 22 controlled by a special circuit 24 of the vehicle on which the apparatus is carried.

The flow rate is regulated conventionally by the return of part of the flow from the pump 14 to the storage tank 10 via line 26 comprising a regulating valve 28. The regulating valve 28 is controlled by a circuit 30 advantageously comprising a microprocessor.

The apparatus further comprises a shutoff valve 32 which may be operated by the user. The apparatus described to this point is conventional and operates in a known manner as will be indicated below in the description of the operation of the entire apparatus.

Circuit 30 which comprises the control means for the regulating valve 28 receives external data as indicated by reference 34, and the signals from the calibration circuit according to the invention.

Calibration line 36 is connected at 38 to line 16 which connects the pump 14 to the spray boom 18. The line 36 is connected to the lower part of a chamber 40 which is also connected, via line 42, to a calibration nozzle 44. The controlled valves 46 and 48 are mounted in series on line 36 to either side of a manometric sensor 50.

Chamber 40 contains a float 52. When the level of fluid in chamber 40 varies the float 52 passes by level sensors 54 and 56. The fluid which leaves the chamber 40 from the time the float 52 is detected by sensor 54 and the time the float is detected by sensor 56 corresponds to a predetermined value.

The upper part of the chamber 40 is equipped with a valve 58 which is normally open but which is closed by float 52 when the latter reaches the top of the chamber 40.

The apparatus further comprises a source of compressed gas 60, e.g. compressed air. The source 60 of compressed gas is connected to a distributor or spool valve 62 having three positions designated by references a, b and c. The three exit ports of the body of the distributor or spool valve 62 are respectively connected to controlled valves 46 and 48 and pressure relief valve 64 for conveying compressed air at a predetermined pressure to check valve 58 and chamber 40. A check valve 66 is mounted in a branch line with respect to pressure relief valve 64.

In position c of the distributor of spool valve 62 as shown in FIG. 1 compressed air is delivered to valve 46 which is closed. Thus, the entire calibration circuit to the right of valve 46 in FIG. 1 is isolated from the spraying apparatus. On the other hand, the manometric sensor 50 is connected to the calibration circuit because the valve 48 does not receive compressed air and is therefor open. When the distributor or spool valve 62 is in position b, neither of valves 46 and 48 receives compressed air whereby springs urge them to their open positions. At this moment the fluid from line 16 can freely enter the calibration circuit and chamber 40. The manometric sensor 50 then indicates the pressure present in the spraying apparatus and in the calibration device.

When the distributor or spool valve 62 is in position a compressed air is delivered to valve 48 to close the same. Valve 48 then isolates the calibration circuit from the spraying apparatus. Meanwhile valve 46 does not receive compressed air and is opened and permits communication of the manometric sensor 50 with the line 16. In this manner manometric sensor 50 indicates the pressure in line 16.

It should be noted that in FIG. 1 the circuit 30 which comprises the control means receives the values of the external parameters, as indicated by reference 34, for example, a parameter representing the speed of the vehicle. It receives a pressure signal from the manometric sensor 50. It further receives signals from the level sensors 54 and 56. Circuit 30 controls regulating valve 28 and distributor or spool valve 62.

The operation of the apparatus of FIG. 1 will now be considered, starting with the initiating or priming phase. In this phase the control means 30 puts the distributor or spool valve 62 in position b. The user closes valves 22 so that the nozzles 20 do not spray fluid on the ground. He then opens the shutoff valve 32. On account of the position of the distributor or spool valve 62, the two control valves 46 and 48 are opened whereby the fluid is delivered to chamber 40, then via line 42 is delivered to nozzle 44 and is expelled into the storage tank 10. During this operation the circuit 30 controls valve 28 as a function of the readings of the manometric sensor 50 and a previously stored calibration parameter. Since the fluid is under pressure, the level in chamber 40 rises and the gas above the liquid is evacuated through check valves 58 and 66 until the float 52 closes check valve 58. At that moment the operator or circuit 30 causes the change of position of the distributor or spool valve 62 which moves to its position c. Valve 48 remains open, but valve 46 is closed so that the calibration circuit is isolated from the spraying circuit. The manometric sensor 50 then indicates the pressure in the calibration circuit. The compressed air from the source 60 is transmitted via pressure relief valve 64 and check valve 58 and it blows the liquid out of the chamber 40. The liquid is driven out at constant pressure owing to the presence of the pressure relief valve 64. The level sensors 54 and 56 detect the passage of float 52 and transmit corresponding signals to circuit 30 which determines the lapse of time between the signals of the two level sensors 54 and 56. The blown out liquid flows to nozzles 44 which discharges it into storage tank 10. The circuit 30 has in its memory the measured volume corresponding to the passage of the float 52 by the two level sensors 54 and 56. It may for example comprise the cross section of chamber 40 and the distance d indicated in FIG. 1. It may therefore calculate the flow rate by dividing the measured volume by the time elapsed between the reception of the signals from the respective level sensors 54 and 56. The calculator then determines the calibration parameter k in the form of a ratio of the flow rate thus calculated and the square root of the pressure transmitted by manometric sensor 50.

Circuit 30 has thus determined the calibration parameter and the apparatus may then proceed to its normal operating mode. The distributor or spool valve 62 is then brought to its position b in which neither of valves 46 and 48 receives compressed air. The two valves are therefore open whereby, when the valves 22 for controlling spray nozzles 20 are open, liquid is conveyed to both spray nozzles 20 and nozzle 44 in the storage tank 12. Accordingly the nozzles 20 and 44 wear at the same rate and each calibration operation takes this wear into account.

Circuit 30 uses for regulation the pressure transmitted by manometric sensor 50, which pressure is representative of the pressure in the proximity of nozzles 20 and also in the proximity of nozzle 44. In the normal operating mode, the liquid raises the float to the top of chamber 40 thereby closing check valve 58.

In the course of operation, whether at the initiative of the operator, or automatically after a predetermined interval, or automatically when the circuit 30 determines the presence of certain conditions, a new calibration cycle may be triggered. At this moment the distributor or spool valve 62 is in its position a in which the compressed air is delivered to valve 48 and not valve 46. As a consequence manometric sensor 50 indicates the pressure upstream of the spray nozzles 20 and permits the circuit 30 to regulate the nozzles 20 in the normal way. Nevertheless, the compressed air is also delivered to the pressure relief valve 64 whereby it conveys the air exhausted by the float 52. Circuit 30 may then measure the flow rate once again. Since manometric sensor 50 does not indicate the pressure in chamber 40 since valve 48 is closed, circuit 30 uses the value of the pressure stored in its memory during the initiation mode. Since the pressure relief valve 64 wears very slowly the use of such a stored value practically does not introduce any error.

The microprocessor of circuit 30 may be programmed so that the initiation phase must be performed each time the apparatus is started up. Calibration cycles may then be triggered at regular fixed intervals or as a function of various conditions.

Figure 2:
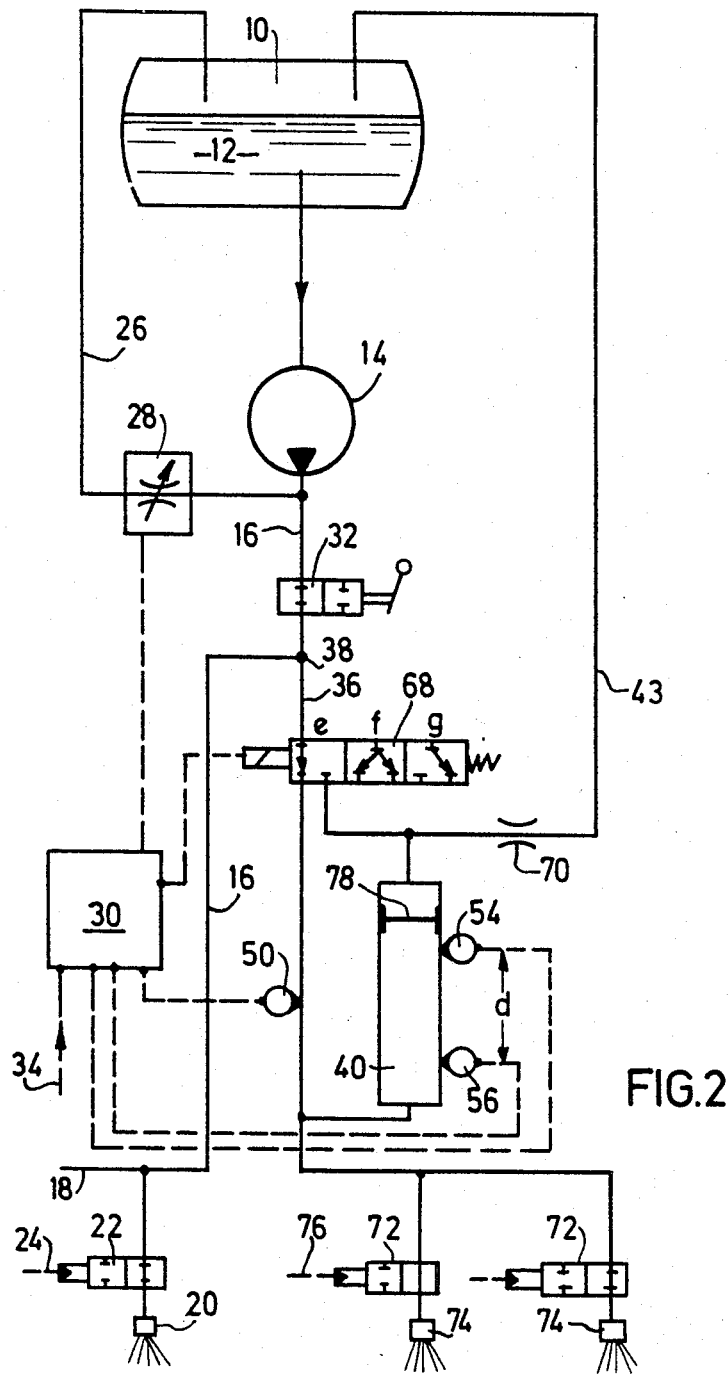
FIG. 2 is another embodiment of the regulated flow spraying apparatus having a calibration device according to the invention.

FIG. 2 illustrates another embodiment according to the invention. References identical to those of FIG. 1 designate similar parts and therefore will not be described again. Indeed, the spraying apparatus is practically identical with that of FIG. 1. It is essentially the calibration circuit that differs. The calibration circuit comprises a calibration line 36 connected at 38 to line 16 of the spraying apparatus. Line 36 comprises a distributor or spool valve 68 controlled by control circuit 30. The distributor or spool valve 68 has only two outlet or exit ports, one which connects storage tank 10 via line 43 through a throttle 70 and the other which connects the valves 72 for controlling the supply of liquid to nozzles 74. Nozzles 74 are identical with nozzles 20 and are part of the nozzles for spraying the ground. The valves 72 are similar to valves 22, and they are controlled, as indicated by reference 76, in the same way as valves 22. Part of the spray boom is therefore used for calibration and the entire boom is used for normal spraying. Chamber 40 comprises, in lieu of float 52, a piston 78 sliding with low friction, the passage of which is detected by level sensors 54 and 56.

The distributor or spool valve 68 has three positions e, f and g in which it communicates only with nozzles 74, with both nozzles 74 and line 43, and only with line 43, respectively.

In normal operation, similar to that described with reference to FIG. 1, the distributor or spool valve 68 is in position e represented in FIG. 2. The liquid is delivered to nozzles 74 in the same way it was delivered to nozzles 20 above. The piston 78 is raised upwards in chamber 40 in which the liquid does not flow. The manometric sensor 50 indicates the pressure upstream of all the nozzles.

When the calibration is triggered the distributor or spool valve 68 is brought to position g. The intermediate position f avoids the stopping of the supply of nozzles 74. In position g the liquid is conveyed simultaneously to nozzles 74 and line 43 via throttle 70. The pressure upstream of the throttle causes the displacement of the piston 78 in chamber 40. As manometric sensor 50 is connected to only the lower part of chamber 40, it indicates the pressure of liquid conveyed to the nozzles 74 during the descent of piston 78. The level sensors 54 and 56 again indicate the point in time the piston 78 passes in front of them. The circuit 30 may therefore determine the calibration parameter in the same way as described with reference to the FIG. 1 embodiment. Yet, the pressure is not as constant as in that embodiment. In this case the circuit 30 may divide the interval of time between the signals of sensors 54 and 56 into a plurality of intervals during which the values of the pressure indicated by the manometric sensor 50 are read. It then calculates the contributions corresponding to each of the time intervals taken into account the corresponding value of pressure. This is a simple calculation. Other approximations understood to those skilled in the art may be used.

When the calibration is terminated the distributor or spool valve 68 is returned to the position e before the piston 78 reaches the bottom of the chamber 40 so that there is no interruption in the supply of the nozzles 74.

Figure 3:
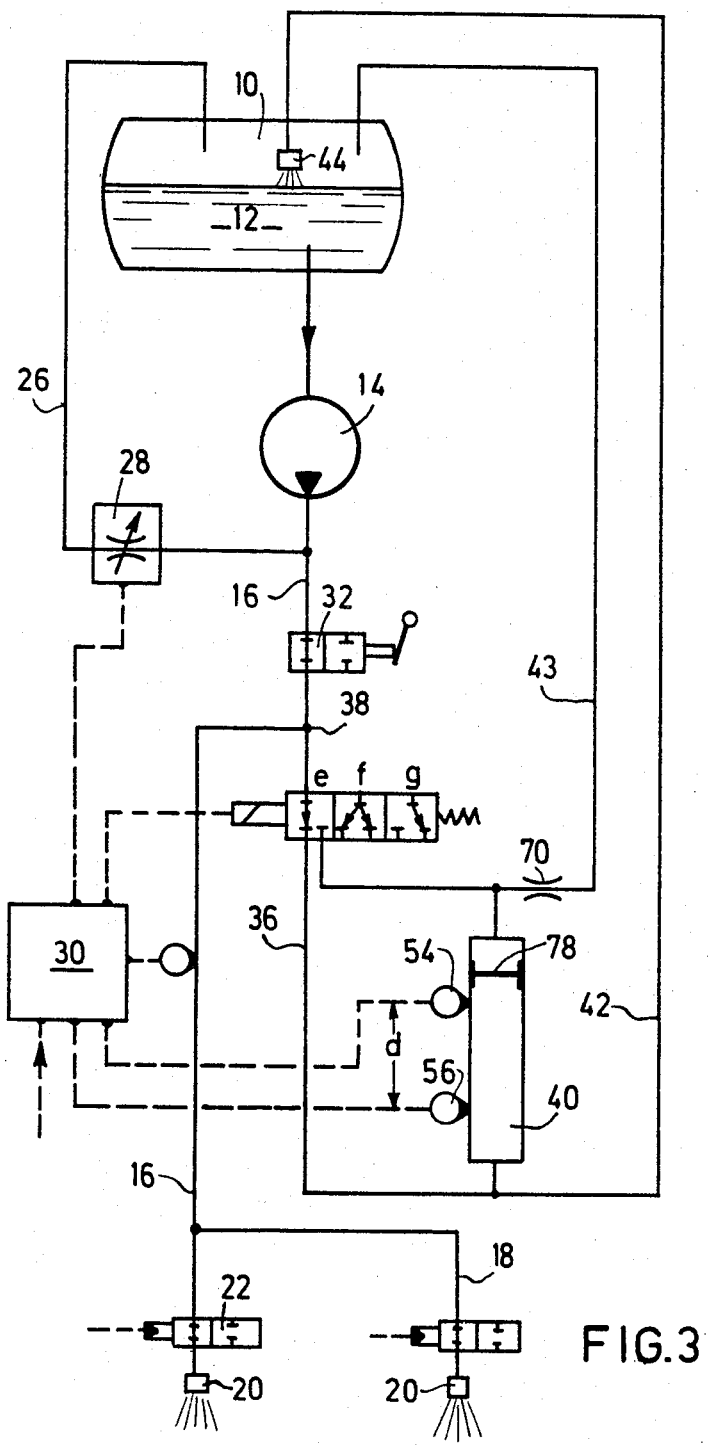
FIG. 3 is a schematic drawing of a modified embodiment of the apparatus of FIG. 2.

FIG. 3 illustrates a modification of the apparatus shown in FIG. 2, in which the liquid blown out of the chamber 40 is not delivered to the nozzles 74 which are part of the spray boom but to a nozzle 44 disposed inside the storage tank 10. The use of this nozzle 44 therefore permits the initiation of the apparatus without spraying on the ground. This apparatus therefore combines certain advantages of the apparatus of the FIG. 1 and FIG. 2 embodiments.

The methods and apparatus described above have numerous advantages with respect to known methods and apparatus. Their essential advantage is, of course, the fact they take into account the variations of operating conditions and the properties of the spraying fluid in particular.

In addition, in all the embodiments, the manometric sensor is used to measure the pressure during calibration and during regulation. The progressive variations of the characteristics of the manometric sensor and the pressure relief valve, when the apparatus has one do not interfer with the regulation equation.

Finally, in the embodiments of FIGS. 2 and 3 the flow rate is measured under real operating conditions. The value of the real spray flow rate by the apparatus may therefore be determined at the time of measurement.

It is understood that the invention is described and illustrated only by way of preferred examples and technical equivalents may be utilized in the component parts without departing from the scope of the invention.

What we claim is:

1. A flow regulated spraying apparatus of the type including a source of fluid under pressure, spray nozzles connected to said source of fluid through a line, regulation means for regulating the flow rate of said spray nozzles by varying the pressure of the fluid delivered to said spray nozzles, and control means for controlling the regulation means as a function of an external parameter and a calibration parameter; wherein the improvement comprises a calibration device comprising:
   calculating means for calculating the calibration parameter;
   flow rate sensing means operatively connected to said source of fluid, said flow rate sensing means including a chamber defining a predetermined volume and mans for measuring the time for emptying said predetermined volume, said flow rate sensing mean being adapted to deliver a flow rate signal to said calculating means;
   a calibration nozzle connected to said flow rate sensing means for receiving fluid detected by said flow rate sensing means;
   a manometric sensor adapted to detect a pressure representative of the fluid pressure in the proximity of said calibration nozzle and transmit a pressure signal to said calculating means; and
   a contact line formed between said calculating means and said control means of said spraying apparatus.

2. A method for calibrating a regulated flow spraying apparatus of the type including:
   a source of spraying fluid under pressure;
   spray nozzles;
   regulation means for regulating the flow rate of said spray nozzles by varying the pressure of fluid delivered to said spray nozzles; and
   control means for controlling the regulation means as a function of at least one external parameter and a calibration parameter;
wherein the improvement comprises:
   conveying fluid from said source of fluid to a calibration circuit comprising flow rate sensing means and at least one calibration nozzle mounted in series;
   measuring the flow rate by filling a predetermined volume with said fluid and measuring the time for emptying the predetermined volume;
   measuring the pressure of the fluid in the calcibration circuit by measuring the pressure of the fluid supplied by the source of fluid;
   regulating the flow rate with said regulating means by adjusting the flow rate of the fluid back to the source;
   calculating the calibration parameter from the measured values of the flow rate and the pressure of the fluid by determining the ratio of the measured flow rate and the pressure at a predetermined exponent, and
   transmitting the calibration parameter to said control means.

3. A method according to claim 2, wherein the calibration operation is repeated automatically at predetermined intervals.

4. A calibration device for a regulated flow spraying apparatus of the type including:
   a source of fluid under pressure, including a storage tank and a pump;
   spray nozzles connected to the source of fluid by a line;
   regulation means for regulating the flow rate of said spray nozzles by varying the pressure of the fluid delivered to the spray nozzles, including a regulating valve disposed in a branch line between the delivery side of said pump and said storage tank; and
   control means for contolling the regulation means as a function of an external parameter and a calibration parameter;
wherein the improvement comprises:
   calculating means for calculating the calibration parameter;
   flow rate sensing means operatively connected to said source of fluid, said flow rate sensing means including a chamber defining a predetermined volume and means for measuring the time for emptying said predetermined volume, said flow rate sensing means being adapted to deliver a flow rate signal to said calculating means;
   a calibration nozzle connected to said flow rate sensing means for receiving fluid detected by said flow rate sensing means;
   a manometric sensor adapted to detect a pressure representative of the fluid pressure in the proximity of said calibration nozzle and transmitting a pressure signal to said calculating means; and
   a contact line formed between said calculating means and said control means of said spraying apparatus.

5. A device according to claim 4, wherein said control means, said calculating means and said contact line together comprise a single microprocessor circuit.

6. A device according to claim 4, wherein said calibration nozzle comprises at least one of said spray nozzles.

7. A device according to claim 6, wherein said calibration nozzle is fed with fluid flowing through a calibration line connected to a supply line for said spray nozzles downstream of the connection of said branch line with said supply line, and wherein a distributor controlled by said control means is mounted on said calibration line for conveying fluid from said pump into either said calibration line or the return line defining therein two compartments, one of which is in permanent connection with said calibration line, downstream of said distributor, for being filled with fluid when said distributor conveys fluid to said calibration nozzle, and the other compartment being in permanent connection with said return line, between said distributor and said throttle means, for being filled with fluid when said distributor conveys fluid in said return line and for displacing said piston so that said one compartment is emptied and said calibration nozzle is fed with fluid coming from said chamber, said manometric sensor being mounted in said calibration line, downstream of said distributor.

8. A device according to claim 4, wherein said calibration nozzle is separate from said spray nozzles and discharges fluid into said storage tank.

9. A device according to claim 8, wherein said calibration nozzle is fed with fluid flowing through a calibration line connected to a supply line for said spray nozzles downstream of the connection of said branch line with said supply line, and wherein a distributor controlled by said control means is mounted on said calibration line for conveying fluid from said pump into either said calibration line or the return line having throttle means and opening at its end in said storage tank, a piston being mounted in said chamber of predetermined volume for defining therein two compartments, one of which is in permanent connection with said calibration line, downstream of said distributor, for being filled with fluid when said distributor conveys fluid to said calibration nozzle, and the other compartment being in permanent connection with said return line, between said distributor and said throttle means, for being filled with fluid when said distributor conveys fluid in said return line and for displacing said piston so that said one compartment is emptied and said calibration nozzle is fed with fluid coming from said chamber, said manometric sensor being mounted in said supply line, downstream of the connection of the latter with said calibration line.

10. A device according to claim 8, wherein said calibration nozzle is fed with fluid flowing through a calibration line comprising an upstream and a downstream sections, said upstream section connecting a supply line for said spray nozzles downstream of the connection of said branch line with said supply line, to the bottom part of said chamber of predetermined volume, and said downstream section connecting said bottom part of said chamber to said calibration nozzle, and wherein first and second controlled valves are mounted on said upstream section, respectively upstream and downstream of said manometric sensor also mounted on said upstream section, both control valves being controlled by a three-positions distributor of a pneumatic actuation circuit including a source of compressed gas and lines connecting said source of compressed gas to said distributor and from said distributor to each of said controlled valves and also to a check valve at the top part of said chamber, said distributor being under control of said control means so that, in a first position of said distributor, said top part of said chamber is opened to the atmosphere and the two controlled valves are open for filling said chamber and feeding said calibrating nozzle with fluid from the pump, whereas in a second position of said distributor, said first and second controlled valves are respectively closed and open and compressed gas is admitted to said top part of said chamber for blowing fluid out of said chamber and feeding said calibration nozzle with fluid from said chamber, said manometric sensor indicating the fluid pressure in said calibration line downstream of the closed first valve, and whereas in a third position of said distributor, said first and second controlled valves are respectively open and closed so that said manometric sensor indicates the fluid pressure in said supply line.

* * * * *